(12) United States Patent
Fujimoto et al.

(10) Patent No.: US 7,845,010 B2
(45) Date of Patent: Nov. 30, 2010

(54) TERMINAL CONTROL APPARATUS AND TERMINAL CONTROL METHOD

(75) Inventors: Hiroshi Fujimoto, Yokohama (JP); Tomohiro Nakagawa, Yokosuka (JP); Akira Kinno, Yokohama (JP); Takashi Yoshikawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1046 days.

(21) Appl. No.: 11/260,407

(22) Filed: Oct. 28, 2005

(65) Prior Publication Data
US 2006/0099847 A1    May 11, 2006

(30) Foreign Application Priority Data
Nov. 1, 2004  (JP) ............... P2004-318490

(51) Int. Cl.
*G08B 23/00* (2006.01)
*G06F 17/30* (2006.01)

(52) U.S. Cl. ............ 726/25; 726/1; 726/2; 726/22; 726/23; 726/24; 726/26; 726/30; 726/34; 713/165; 713/166; 713/188

(58) Field of Classification Search ............ 726/22, 726/25–26
See application file for complete search history.

(56) References Cited

U.S. PATENT DOCUMENTS

| | | | | |
|---|---|---|---|---|
| 5,835,911 A * | 11/1998 | Nakagawa et al. | ............ | 707/203 |
| 5,854,916 A * | 12/1998 | Nachenberg | ............... | 703/21 |
| 6,185,689 B1 | 2/2001 | Todd, Sr. et al. | | |
| 6,199,204 B1 * | 3/2001 | Donohue | ............... | 717/178 |
| 6,651,249 B2 * | 11/2003 | Waldin et al. | ............... | 717/170 |
| 7,055,146 B1 * | 5/2006 | Durr et al. | ............... | 717/162 |
| 2002/0138760 A1 * | 9/2002 | Naitoh | ............... | 713/201 |
| 2003/0088810 A1 * | 5/2003 | Marshall | ............... | 714/38 |
| 2003/0115511 A1 | 6/2003 | Kubota | | |
| 2003/0126472 A1 | 7/2003 | Banzhof | | |
| 2003/0233581 A1 * | 12/2003 | Reshef et al. | ............... | 713/201 |
| 2004/0093405 A1 * | 5/2004 | 't Hooft et al. | ............... | 709/224 |
| 2004/0111531 A1 * | 6/2004 | Staniford et al. | ............ | 709/246 |
| 2004/0260940 A1 * | 12/2004 | Berg et al. | ............... | 713/200 |

(Continued)

FOREIGN PATENT DOCUMENTS

JP    9-204344    8/1997

(Continued)

OTHER PUBLICATIONS

Liu Bo, et al., "A Computer System Vulnerability Handling Architecture Based on CORBA", China Academic Journal Electronic Publishing House, Sep. 30, 2004, pp. 69-70.

*Primary Examiner*—Edan Orgad
*Assistant Examiner*—Jenise E Jackson
(74) *Attorney, Agent, or Firm*—Oblon, Spivak, McClelland, Maier & Neustadt, L.L.P.

(57) ABSTRACT

A terminal control apparatus includes a fragility detection unit, a control content decision unit, a terminal information registration unit, a terminal specifying unit and a control content notification unit. The terminal specifying unit specifies, based on the fragility information and the terminal information acquired by the terminal information registration unit, a terminal device to be affected by the fragility of the program. The control content notification unit notifies the control contents to the terminal device specified by the terminal specifying unit.

10 Claims, 4 Drawing Sheets

| OCCURRENCE SITUATION | CONTROL TARGET |
|---|---|
| Time of data reception from arbitrary other end by using Socket | Read system call for receiving Socket |
| Time of data transmission to arbitrary other end by using Socket | Write system call for transmitting Socket |
| Time of data reception from X by using Socket | Read system call for receiving Socket in which transmission source address is X |
| Time of data transmission to X by using Socket | Write system call for transmitting Socket in which transmission source address is X |
| Time of terminal file writing | write system call for file |
| Time of processing execution | exec.-related system call using program concerned as argument |

| DEGREE OF SEVERITY | PROCESSING/CONTROL CONTENTS |
|---|---|
| 1 | To issue alert at time of starting program execution |
| 2 | To issue alert at fixed timing when processing regarding fragility is performed |
| 3 | To issue alert every time when processing regarding fragility is performed |
| 4 | Not to permit processing regarding fragility |
| 5 | Not to permit execution of program, or to shut down program when program is under execution |

U.S. PATENT DOCUMENTS

| | | | |
|---|---|---|---|
| 2005/0132206 A1* | 6/2005 | Palliyil et al. | 713/188 |
| 2007/0006314 A1* | 1/2007 | Costa et al. | 726/25 |
| 2008/0005555 A1* | 1/2008 | Lotem et al. | 713/150 |
| 2009/0019547 A1* | 1/2009 | Palliyil et al. | 726/25 |

FOREIGN PATENT DOCUMENTS

| | | |
|---|---|---|
| JP | 2001-229032 | 8/2001 |
| WO | WO 02/03178 A2 | 1/2002 |

\* cited by examiner

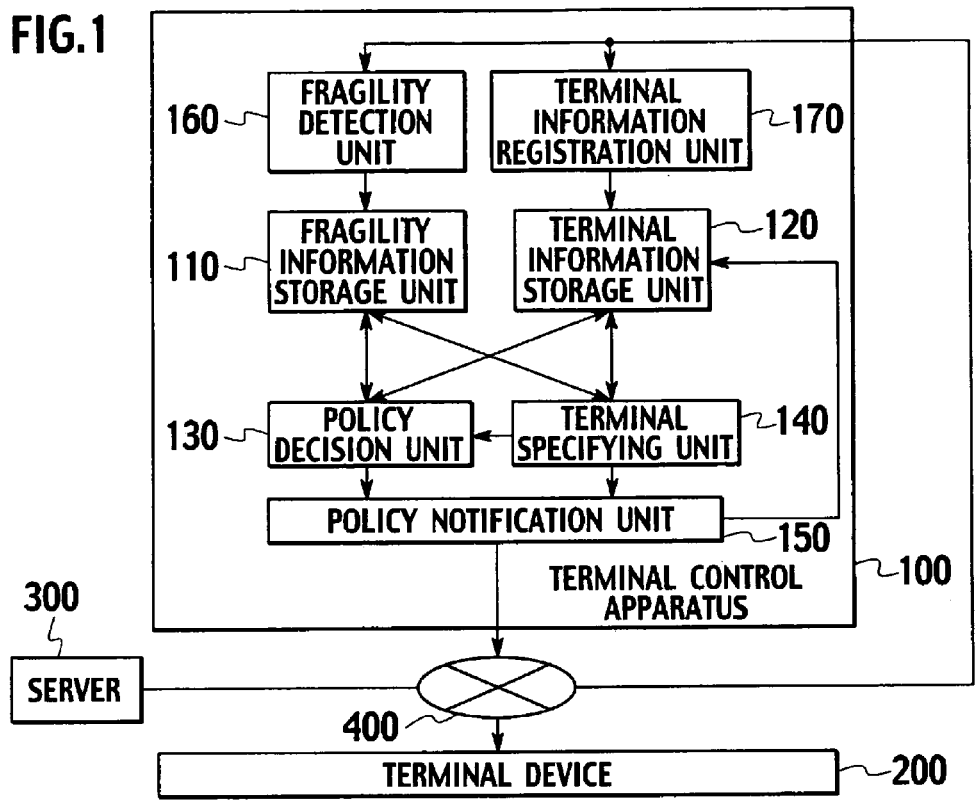

| UPDATE DATE | PROGRAM NAME | PROGRAM VERSION | OCCURRENCE SITUATION | CONTENTS OF FRAGILITY | TARGET SYSTEM | DEGREE OF SEVERITY |
|---|---|---|---|---|---|---|
| 2004/08/26 | Browser_1 | 2.4 | Time of data transmission to Mailer_1 by Socket | Transmission of transmission data to web site | A(Ver.1) B(Ver.2) | 4 |
| 2004/08/25 | Mailer_2 | 1.0 | Time of data reception from arbitrary other end by Socket | Execution of arbitrary code through network | B(Ver.2) | 5 |
| 2004/08/24 | Scheduler_1 | 0.6 | Time of file writing | Consumption of terminal resource | All | 1 |
| 2004/08/24 | Game_1 | 1.0 | Time of processing execution | Consumption of terminal resource | All | 1 |

| 1 ⟷ 5 |
|---|
| LOWEST    HIGHEST |

FIG.3

| DEGREE OF SEVERITY | CONTENTS OF FRAGILITY | OCCURRENCE POSSIBILITY |
|---|---|---|
| 1 | Terminal resource is consumed | Low |
| 2 | Specific file is transmitted, and/or arbitrary code is executed from terminal device | Low |
| 3 | Terminal resource is consumed | High |
| 4 | Specific file is transmitted, and/or arbitrary code is executed from terminal device | High |
| 5 | Arbitrary code is executed through network | - |

| UPDATE DATE | TERMINAL DEVICE NAME | PROGRAM UPDATE DATE | OPERATING SYSTEM | PROGRAM NAME | PROGRAM VERSION | NOTIFICATION DATE OF POLICY | CONTROL POLICY |
|---|---|---|---|---|---|---|---|
| 2004/08/28 | Machine_1 | 2004/08/26 | A(ver.1) | Browser_1 | 2.4 | 2004/8/28 | AAA |
| | | | | Mailer_1 | 1.0 | | |
| | | | | Game_1 | 1.0 | | |
| 2004/08/24 | Machine_2 | 2004/08/24 | B(ver.2) | Mailer_2 | 3.2 | 2004/8/20 | BBB |
| | | | | Scheduler_2 | 0.6 | | |
| | | | | Game_2 | 1.0 | | |

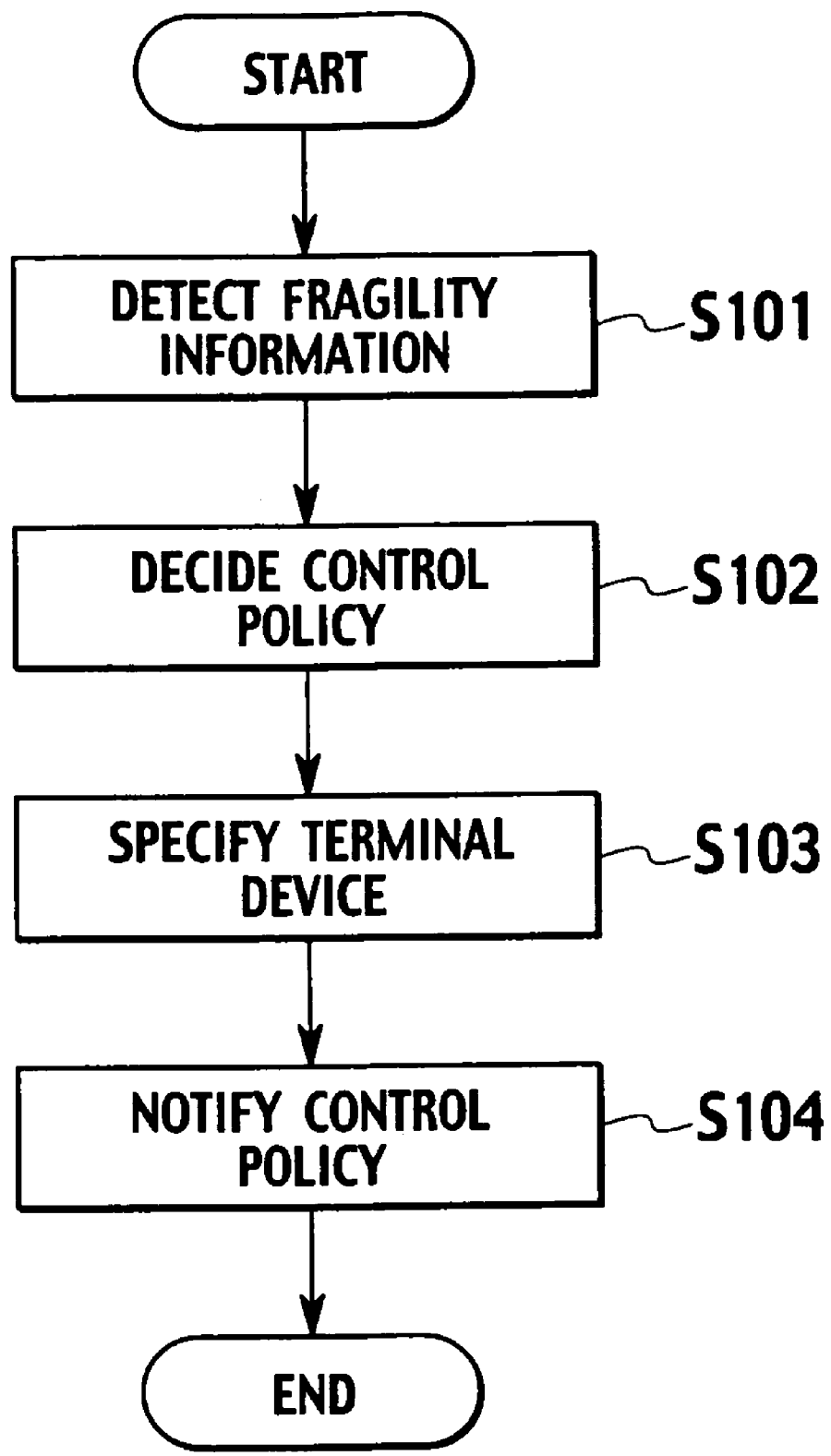

TERMINAL CONTROL APPARATUS AND TERMINAL CONTROL METHOD

CROSS REFERENCE TO RELATED APPLICATIONS

This application is based upon and claims the benefit of priority from prior Japanese Patent Application P2004-318490 filed on Nov. 1, 2004; the entire contents of which are incorporated by reference herein.

BACKGROUND OF THE INVENTION

1. Field of the Invention

The present invention relates to a terminal control apparatus and a terminal control method for controlling a terminal device.

2. Description of the Related Art

Fragility of a program causes a trouble to the entire system of a terminal device. Therefore, various countermeasures against the fragility have been proposed heretofore. For example, there is a technology that an operating system of the terminal device forcibly restricts an access right to valuable information such as a file and to a hardware resource such as a network interface against the program that may have the fragility.

Moreover, the fragility of the program is also discovered and released by a vendor, specialist and user association of the program. However, it sometimes takes a time from the release of the fragility of the program to a vendor's development of a correction program which corrects the program concerned.

Accordingly, it is frequent that, together with the discovered fragility, emergency means for dealing with the fragility concerned is released. However, even if information on the fragility of the program is released, it is difficult for many users to always confirm every piece of the released information. Moreover, even if acquiring the information, in some cases, the users lack expertise and cannot deal with the fragility appropriately, and further, cannot even determine whether or not the information concerned affects terminal devices of their own, or determine a degree of severity of the information, and the like. Furthermore, it sometimes occurs that the users of the terminal devices leave the fragility as it is without introducing the correction program for the fragility to the terminal devices.

Hence, there has been proposed a technology for automatically restricting an operation of the program without making the users aware thereof and reducing a damage caused by the fragility. For example, there has been proposed a terminal device which monitors an operation state of a program A, and upon detecting an abnormal operation of the program A, forcibly shuts down the program A under abnormal operation, also normally shuts down a program B operating in conjunction with the program A, and restarts an operating system (for example, refer to Japanese Patent Laid-Open Publication 2001-229032).

However, in the terminal device which monitors the operation state of the program and forcibly shuts down the program upon detecting the abnormal operation thereof, it has sometimes occurred that the damage caused by the fragility of the program has already expanded when the abnormal operation was detected. Accordingly, even if the program is forcibly shut down after the detection of the abnormal operation, this was not an effective countermeasure against the fragility.

Moreover, the terminal device determines whether or not the operation thereof coincides with an already known abnormal operation pattern, or determines whether or not the operation thereof is out of the normal operation, thus detecting the abnormal operation. Accordingly, the above-described forcible shut down does not become the effective means against an unknown abnormal operation in some cases. Furthermore, the terminal device can do no more than shut down the program forcibly upon detecting the abnormal operation, and cannot make a flexible control, either.

In this connection, it is an object of the present invention to provide a terminal control apparatus and a terminal control method for rapidly and flexibly coping appropriately with a terminal device for which it is necessary to deal with fragility of a program.

SUMMARY OF THE INVENTION

A first aspect of the present invention is to provide a terminal control apparatus, including: (A) a fragility detection unit which detects fragility information concerning fragility of a program; (B) a control content decision unit which decides control contents of an operation of a terminal device based on the fragility information; (C) a terminal information registration unit which acquires terminal information concerning the terminal device; (D) a terminal specifying unit which specifies, based on the fragility information and the terminal information acquired by the terminal information registration unit, a terminal device to be affected by the fragility of the program; and (E) a control content notification unit which notifies the control contents to the terminal device specified by the terminal specifying unit.

A second aspect of the present invention is to provide a terminal control method, including: (A) detecting fragility information concerning fragility of a program; (B) deciding control contents of an operation of a terminal device based on the fragility information; (C) acquiring terminal information concerning the terminal device; (D) specifying, based on the fragility information and the acquired terminal information, a terminal device to be affected by the fragility of the program; and (E) notifying the control contents to the specified terminal device.

BRIEF DESCRIPTION OF THE DRAWINGS

FIG. 1 is a block diagram showing a configuration of a terminal control apparatus according to an embodiment of the present invention.

FIG. 2 is a table showing a fragility information storage unit according to the embodiment of the present invention.

FIG. 3 is a table showing severity determination information according to the embodiment of the present invention.

FIG. 4 is a table showing a terminal information storage unit according to the embodiment of the present invention.

FIG. 6 is a flowchart showing a procedure of a terminal control method according to the embodiment of the present invention.

DETAILED DESCRIPTION OF THE INVENTION

Figure 5:
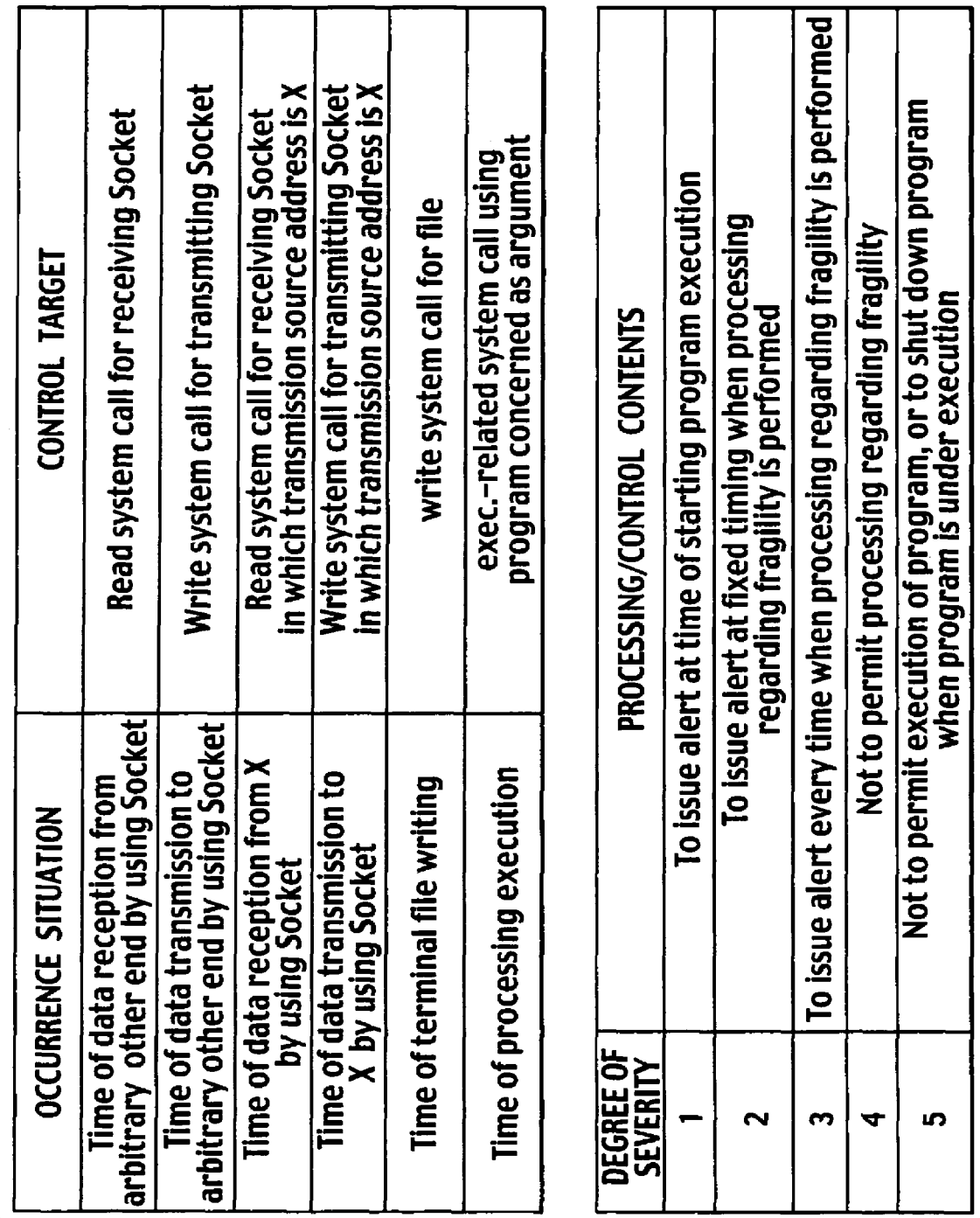
FIG. 5 is tables showing policy decision information according to the embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

As shown in FIG. 1, a terminal control apparatus 100 includes a fragility information storage unit 110, a terminal information storage unit 120, a policy decision unit 130, a terminal specifying unit 140, a policy notification unit 150, a fragility detection unit 160, and a terminal information registration unit 170. The terminal control apparatus 100 controls an operation of a terminal device 200 by using control contents (hereinafter referred to as a "control policy") for the operation of the terminal device as to how to control the operation of the terminal device. The terminal control apparatus 100 and the terminal device 200 are connected to each other, for example, through a network 400.

Fragility information is stored in the fragility information storage unit 110. The fragility information is information concerning fragility of a program. The fragility of the program refers to a factor inhibiting appropriate execution of the program, which exists in the program. For example, the fragility includes data transfer to unintentional process, device, and means, buffer overflows which exist in a large amount in various programs regarding an operating system (OS), an application, and the like, execution of a program code from an external device, which causes a problem on security, and the like. For example, the fragility results from a bug in coding, and the like.

FIG. 2 shows an example of the fragility information storage unit 110. In the fragility information storage unit 110, update dates of the fragility information, program identification information of the programs each having the fragility, the fragility information, and the like are stored in association with one another.

The program identification information is information for identifying the programs. The program identification information includes, for example, program names, program versions, and the like. For example, as shown in FIG. 2, the programs include programs for executing processing regarding a browser, processing regarding electronic mail, processing regarding a scheduler, processing regarding a game, and the like.

For example, the fragility information includes contents of the fragility, situations where the fragility occurs (hereinafter referred to as "occurrence situations"), operating systems affected by the fragility (hereinafter referred to as "target systems"), hardware affected by the fragility (hereinafter referred to as "target hardware"), middleware affected by the fragility (hereinafter referred to as "target middleware"), degrees of severity of the fragility, and the like.

The contents of the fragility include the facts that a hardware resource of the terminal device 200 (hereinafter referred to as a "terminal resource") is consumed, that the data such as a file is transferred to the unintentional process, device, and means, that the terminal device 200 executes an arbitrary program code, that the arbitrary program code of the terminal device 200 is executed by an external device through the network 400, and the like.

The occurrence situations include a time of receiving the data and a time of transmitting the data in a communication between processes, a time of writing the data such as the file and a time of reading the data, a time of executing the processing, a time of using the network, a time of executing a specific program, and the like. The time of executing the specific program refers to the case where the fragility emerges when interlocking with the specific program.

Each target system can be expressed by using a system name, a version, and the like of the operating system (OS), and system identification information capable of identifying the operating system. Moreover, the target hardware and the target middleware can also be expressed by using a hardware name, a middleware name, and the like.

The degree of severity of the fragility represents an extent of an influence which the fragility gives to the terminal device 200. For example, the degree of severity of the fragility may be a degree of severity on security, and a degree of severity on continuation of the operation.

For example, in the fragility information storage unit 110, an update date "2004/08/26", a program name "Browser_1", a version "2.4", an occurrence situation "time of data transmission to Mailer_1 in inter-process communication using Socket", contents of the fragility "there is a possibility that transmission data will be transmitted to a specific web site", target systems "A (ver. 1)" and "B (ver. 2)", and a degree of severity "4" are stored in association with one another. In FIG. 2, the degree of severity is set at five stages, in which "1" represents the lowest degree of severity, and "5" represents the highest degree of severity.

The fragility detection unit 160 detects the fragility information. For example, the fragility detection unit 160 receives the program identification information and the fragility information thereof from the terminal device 200 or a server 300 through the network 400, thus making it possible to detect the fragility information. The server 300 provides the fragility information. For example, the server 300 is provided by a specialist of the security, an association of users who actually use the program, a vendor who has developed and provided the program, or the like.

Moreover, for example, the fragility detection unit 160 receives the program identification information, an operation status of the program concerned, and the like from the terminal device 200 through the network 400. Then, the fragility detection unit 160 determines the fragility based on the received operation status and the like, thus making it possible to detect the fragility information.

Furthermore, based on the received fragility information, the fragility detection unit 160 determines other pieces of the fragility information, thus making it possible to detect the fragility information. For example, the fragility detection unit 160 can detect the degree of severity based on the contents of the fragility, an occurrence possibility of an attack to the fragility, and the like.

For example, the fragility detection unit 160 can set degree-of-severity determination information in which the degree of severity, the contents of the severity, and the occurrence possibility of the attack, which are as shown in FIG. 3, are associated with one another. The fragility detection unit 160 can determine the occurrence possibility of the attack based on the contents and occurrence situation of the fragility, the target system, the target hardware, the target middleware, and the like.

The fragility detection unit 160 compares the contents of the fragility, the occurrence possibility of the attack, and the degree-of-severity information with one another, thus making it possible to determine the degree of severity. For example, even if the contents of the fragility are the same "consumption of terminal resource", the fragility detection unit 160 determines that the degree of severity is "1" when the occurrence possibility is low, and determines that the degree of severity is "3" when the occurrence possibility is high. As described above, the degree of severity can be set high in proportion to the occurrence possibility.

Moreover, even if the occurrence possibilities are the same "high", the fragility detection unit 160 determines that the fragility is "3" when the contents of the fragility are the "consumption of terminal resource", and determines that the degree of fragility is "4" when the contents of the fragility are the "transmission of specific file". As described above, for example, the degree of severity can be set higher for the case where the problem on the security and an influence from a malfunction are larger.

Furthermore, when the contents of the severity are regarding the problem on the security and are extremely large, such as the "execution of arbitrary program code through network", the fragility detection unit 160 may determine that the degree of severity is "5" that is the maximum value without determining the occurrence possibility.

The fragility detection unit 160 stores the detected fragility information in the fragility information storage unit 110. The fragility detection unit 160 stores the update date of the fragility information, the program identification information, and the fragility information in the fragility information storage unit 110 in association with one another.

Note that, preferably, the fragility detection unit 160 verifies correctness of the detected fragility information. For example, there are a possibility that the terminal device 200 and the server 300 themselves as transmission sources of the fragility information and the operation status of the program are not reliable, a possibility that the information is manipulated in a transmission path of the fragility information and the operation status of the program to the terminal control apparatus 100, and the like. Accordingly, the fragility detection unit 160 can verify the correctness of the fragility information, and can store only the fragility information determinable to have the correctness in the fragility information storage unit 110.

For example, the fragility detection unit 160 creates the contents of the fragility having a possibility to occur based on the target system, the target hardware or the target middleware, the occurrence situation, and the like, which are included in the received program identification information and fragility information. Then, the fragility detection unit 160 determines whether or not the received contents of the fragility coincide with the created contents of the fragility and whether or not the fragility has a possibility to actually occur, thus making it possible to verify the correctness of the fragility information.

Moreover, in the case of receiving the operation status of the program, the fragility detection unit 160 detects correctness thereof, thus making it possible to verify the correctness of the fragility information detected from the operation status. In this case also, the fragility detection unit 160 determines whether or not the received operation status has a possibility to occur based on the received program identification information and operation status in a similar way to the above, thus making it possible to verify the correctness of the fragility information.

Terminal information concerning the terminal devices is stored in the terminal information storage unit 120. The terminal information includes information for specifying the terminal devices (hereinafter referred to as "terminal identification information"), the operating systems provided in the terminal devices, the hardware provided in the terminal devices, the middleware provided in the terminal devices, the programs owned by the terminal devices, update timing of the programs in the terminal devices, notification timing of the control contents (control policy) for the terminal devices, the notified control contents (control policy), and the like. The terminal identification information includes terminal device numbers, terminal device names, and the like.

FIG. 4 shows an example of the terminal information storage unit 120. In the terminal information storage unit 120, update dates of the terminal information, terminal names, update dates of the programs, the system identification information of the operating systems provided in the terminal devices, program names and program versions of the programs owned by the terminal devices, notification dates of the policies, and the notified control policies are stored in association with one another.

For example, as shown in FIG. 4, in the terminal information storage unit 120, the update date of the terminal information "2004/8/28", the terminal device name "Machine_1", the program update date "2004/8/26", the operating system "A (ver. 1)", the program name "Browser_1" and the program version thereof "2.4", the program name "Mailer_1" and the program version thereof "1.0", the program name "Game_1" and the program version thereof "1.0", the notification date of the policy "2004/8/28", and the control policy "AAA" are stored in association with one another.

The terminal information registration unit 170 acquires the terminal information, and stores the terminal information in the terminal information storage unit 120. The terminal information registration unit 170 receives the terminal information from the terminal device 200, for example, through the network 400, thus making it possible to acquire the terminal information. In the terminal device 200, update (version up) of the programs introduced thereinto and introduction of a new program are performed. For this purpose, the terminal information registration unit 170 acquires the terminal information from the terminal device 200 every time when the programs are updated and newly introduced, or periodically. The terminal information registration unit 170 stores the acquired terminal information in the terminal information storage unit 120, and updates the terminal information, thus storing the up-to-date terminal information in the terminal information storage unit 120.

The terminal information registration unit 170 may also be adapted to verify the correctness of the acquired terminal information, and to store only the terminal information determinable to have the correctness in the terminal information storage unit 120. For example, the terminal information registration unit 170 can verify the correctness by using an encryption technology using a hash value and the like. For example, the terminal information storage unit 170 receives the terminal information and the hash value calculated by using the terminal information from the terminal device 200, and calculates a hash value from the received terminal information. The terminal information registration unit 170 compares the received hash value and the calculated hash value with each other. When both of the hash values coincide with each other, it can be determined that the terminal information is not manipulated and has the correctness.

The policy decision unit 130 is a control content decision unit which decides the control contents for controlling the operation of the terminal device, that is, the control policy based on the fragility information. Based on the fragility information, in order to deal with the fragility thereof, the policy decision unit 130 decides, as the control policy, contents of an operation control to be implemented for the terminal device into which the program having the fragility has been introduced.

For example, the policy decision unit 130 can decide a control policy regarding a system call, a control policy regarding the hardware, and a control policy regarding the middleware. According to this, the terminal control apparatus 100 can flexibly control the operation of the terminal device regarding accesses to the system call, the hardware, and the middleware.

For example, the policy decision unit 130 can set, as the control policy, types of the system call, the hardware, the middleware, and the like to be controlled (hereinafter referred to as "control targets"), and contents of processing and restriction to be performed for the control targets (hereinafter referred to as "processing/restriction contents").

The policy decision unit 130 can set policy decision information in which the control targets, the processing/restriction contents, and the fragility information are associated with one another. For example, as shown in FIG. 5, the policy decision unit 130 can set the policy decision information in which the occurrence situations and the control targets are associated with each other and the degrees of severity and the processing/restriction contents are associated with each other. The policy decision unit 130 acquires the fragility information from the fragility information storage unit 110. The policy decision unit 130 can decide the control policy based on the acquired fragility information and the policy decision information.

For example, from the fragility information storage unit 110, the policy decision unit 130 acquires the occurrence situation "time of data transmission to Mailer_1 in interprocess communication using Socket" and the degree of severity "4" as the fragility information of the program "Browser_1" shown in FIG. 2. The policy decision unit 130 refers to the policy decision information shown in FIG. 5 based on the acquired fragility information, and decides, as the control target, "Write system call to transmitting Socket in which transmission destination address is specific other end X" associated with "time of data transmission using Socket from specific other end X".

Moreover, the policy decision unit 130 decides the processing/restriction contents to "not to permit processing related to fragility" associated with the degree of severity "4". Then, the policy decision unit 130 synthesizes the control target and the processing/restriction contents, and decides the control policy "to completely prohibit Write system call to transmitting Socket in which transmission destination address is Mailer_1". As described above, the policy decision unit 130 can select an appropriate control policy in response to the fragility information from plural candidates for the control policy, and can decide the control policy to be applied.

FIG. 5 shows the control policies regarding the system call as an example of the control policies. In the case of control policies regarding the hardware and the middleware, for example, the policy decision unit 130 can set "access to memory" and the like as the control target. Then, for example, the policy decision unit 130 can decide a control policy "to issue an alert when memory is to be accessed" when the degree of severity is "3". Moreover, the policy decision unit 130 may also decide a control policy to control an operation of a resource manager that manages a resource of the hardware, as a control policy related to the hardware.

Moreover, there is a program that causes the fragility when interlocking with a specific program. Accordingly, the policy decision unit 130 can decide such a control policy to prohibit execution of the program that causes the fragility by interlocking with the specific program when the specific program is executed.

Furthermore, it is preferable that the policy decision unit 130 decides the control policy in response to the update of the program. In this case, the policy decision unit 130 acquires, from the terminal specifying unit 140, the terminal identification information of the terminal device in which the program has been updated. The policy decision unit 130 acquires the program identification information and the control policy already notified to the terminal device concerned from the terminal information storage unit 120 based on the acquired terminal identification information.

The policy decision unit 130 determines whether or not the program from which the fragility is removed by the update of the program and the program of which fragility information is changed thereby exist based on the fragility information, the program identification information, and the already notified control policy.

When the program from which the fragility is removed and the program of which fragility information is changed exist, the policy decision unit 130 newly decides the control policy. For example, when the fragility of the program is removed therefrom, and the terminal device comes not to have the target program of the operation control, the policy decision unit 130 can decide a control policy to release the processing and the restriction, which have been performed in order to deal with the fragility. Moreover, when the fragility information is changed, the policy decision unit 10 can decide the control policy based on new fragility information.

According to the above, the terminal control apparatus 100 can flexibly control the terminal device in response to the update of the program. Hence, the terminal device, for which it has become unnecessary to perform the operation control because the fragility of the program is removed therefrom owing to introduction of the correction program, and the like, can be prevented from receiving execution of an unnecessary control continuously.

The policy decision unit 130 associates the decided control policy and the program identification information with each other, and inputs the associated control policy and program identification information to the policy notification unit 150. Note that the policy decision unit 130 may also set the policy decision information by itself, or for example, may also use policy decision information set by the other device such as the terminal device 200 and the server 300 and provided through the network 400.

Moreover, it is preferable that the policy decision unit 130 be realized by hardware having tamper-resistant property. According to this, the policy decision unit 130 itself can be prevented from being attacked. Hence, for example, the policy decision unit 130 can be prevented from creating an erroneous control policy and a malicious control policy, which may be caused by the manipulation of the policy decision information and the like.

Note that, in the case of verifying the correctness of the fragility information detected by the fragility detection unit 160 and storing only the fragility information determinable to have the correctness in the fragility information storage unit 110, the policy decision unit 130 decides the control policy by using the fragility information stored in the fragility information storage unit 110, thus making it possible to decide the control policy based on the fragility information determined to have the correctness by the verification. Hence, the terminal control apparatus 100 can control the terminal device by using only the fragility information determined to have the correctness, and can surely perform the appropriate control for the terminal device. Specifically, by using the fragility information of which reliability is ensured, the terminal control apparatus 100 can avoid performing the erroneous control.

The terminal specifying unit 140 specifies the terminal device affected by the fragility of the program based on the fragility information and the terminal information. The terminal specifying unit 140 acquires the fragility information from the fragility information storage unit 110, and acquires the terminal information from the terminal information storage unit 120.

For example, the terminal specifying unit 140 compares the program identification information and the system identification information of the target system, which are included in the fragility information, with the program identification information and the system identification information, which are included in the terminal information. The terminal specifying unit 140 specifies the terminal device, in which the program identification information and the system identification information, which are included in the fragility information, exist in the terminal information, as the terminal device affected by the fragility.

For example, in the case of comparing the fragility information shown in FIG. 2 and the terminal information shown in FIG. 4 with each other, the terminal specifying unit 140 specifies the terminal device of which terminal device name is "Machine_1", which includes the operating system "A (ver. 1)", has the programs "Browser_1" and the "Mailer_1" as a set, and further has the program "Game_1", as the terminal device affected by the fragilities of the "Browser_1" and the "Game_1".

Also in the case of specifying the terminal device based on the target hardware and the target middleware, the terminal specifying unit 140 can specify the terminal device in a similar way to the case based on the target system. As described above, the terminal specifying unit 140 can specify the terminal device affected by the fragility based on the operating system, the hardware, and the middleware, which are provided in the terminal device, in consideration of the fragility occurring depending on these.

Moreover, it is preferable that the terminal specifying unit 140 specifies the terminal device in which the program has been updated, and notifies the terminal device concerned to the policy decision unit 130. The terminal specifying unit 140 acquires the update date of the program and the notification date of the policy from the terminal information storage unit 120, and compares both thereof with each other. The terminal specifying unit 140 specifies the terminal device, in which the update date of the program is newer than the notification date of the policy, as the terminal device in which the program has been updated. The terminal specifying unit 140 inputs the terminal identification information of the specified terminal device to the policy decision unit 130.

Moreover, the fragility of the program sometimes occurs when the specific program interlocks therewith. Accordingly, the terminal specifying unit 140 can specify, as the terminal device affected by the fragility, the terminal device including the entire specific program and program causing the fragility in the case of interlocking with the specific program.

The terminal specifying unit 140 associates the terminal identification information of the specific terminal device and the program identification information of the affected program with each other, and inputs the associated terminal identification information and program identification information to the policy notification unit 150.

The policy notification unit 150 is a control content notification unit which notifies the control policy (control contents) to the terminal device specified by the terminal specifying unit 140. The policy notification unit 150 acquires the control policy associated with the program identification information from the policy decision unit 130. The policy notification unit 150 acquires the terminal identification information associated with the program identification information from the terminal specifying unit 140.

The policy notification unit 150 matches the program identification information associated with the control policy and the program identification information associated with the terminal identification information with each other, and notifies, to the terminal device 200 identified by the terminal identification information, the control policy in which the program identification information coincides therewith, through the network 400.

After notifying the control policy, the policy notifying unit 150 stores the notification date of the policy (notification timing of control contents) and the notified control policy in the terminal information storage-unit 120.

(Terminal Control Method)

FIG. 6 shows a procedure of a terminal control method. First, the terminal control apparatus 100 detects the fragility information of the program, and stores the detected fragility information in the fragility information storage unit 110 (S101). Next, the terminal control apparatus 100 decides the control policy of the operation of the terminal device 200 based on the fragility information and the like (S102). Moreover, the terminal control apparatus 100 specifies the terminal device affected by the fragility of the program based on the fragility information and the terminal information (S103). Then, the terminal control apparatus 100 notifies the control policy to the terminal device 200 specified in Step (S104). Note that an order of Steps (S102) and (S103) may be inverted.

(Effect)

According to the terminal control apparatus 100 and the terminal control method, which are as described above, the fragility information of the program can be detected, and in response to the detected fragility information, the control policy of the operation of the terminal device 200 can be decided. Hence, the terminal control apparatus 100 can flexibly control the operation of the terminal device 200 as a countermeasure against the fragility. In addition, upon detecting the fragility information of the program, the terminal control apparatus 100 specifies the terminal device 200 to be affected by the fragility concerned, and can notify the control policy thereto. Hence, the terminal control apparatus 100 can rapidly and flexibly cope appropriately with the terminal device 200 for which it is necessary to deal with the fragility of the program.

Specifically, in the terminal device that monitors the operation status of the program and forcibly shuts down the program when detecting the abnormal operation, the damage resulting from the fragility of the program sometimes has already expanded when the abnormal operation was detected. However, according to the terminal control apparatus 100, it is possible to deal with the fragility when the fragility information can be detected. In addition, the terminal control apparatus 100 detects not the abnormal operation but the fragility causing the abnormal operation, and accordingly, can be effective means against the unknown abnormal operation. Moreover, the various control policies can be decided in response to the fragility information, and accordingly, an extremely flexible control is enabled as compared with the conventional method which can do no more than forcibly shut down the program.

Moreover, the method of this embodiment does not restrict the operation of the program even during a normal operation thereof, like the method of forcibly restricting the access right against the program. Specifically, the restriction can be performed limitedly for a period from the detection of the fragility to the removal thereof. Moreover, the appropriate control can be performed no matter whether or not the user of the terminal device 200 is aware thereof. From the above, for example, it is possible to prevent an administrator's authority of the terminal device 200 from being given to an attacker, important information in the terminal device 200 from flowing out, an attack to the other terminal device by using the terminal device 200 as a stepping stone from being performed, and so on, which may be caused by the operation of the program having the fragility, and by the malicious attack to the program concerned. Since it is difficult to eradicate the bug itself, the method of this embodiment is an extremely effective technology.

Moreover, the fragility detection unit 160 can verify the correctness of the fragility information detected thereby, and the policy decision unit 130 (control content decision unit) can decide the control contents based on the fragility information determined to have the correctness by the verification. According to this, the terminal control apparatus 100 can control the terminal device by using only the fragility information determined to have the correctness, and can surely perform the appropriate control for the terminal device.

Moreover, the terminal specifying unit 140 can specify the terminal device in which the program has been updated, and the policy decision unit 130 (control content decision unit) can decide the control contents in response to the update of the program. According to this, the terminal control apparatus 100 can flexibly control the terminal device in response to the update of the program.

Furthermore, the policy decision unit 130 (control content decision unit) can decide at least one of the control contents regarding the system call, the control contents regarding the hardware, and the control contents regarding the middleware. According to this, the terminal control apparatus 100 can flexibly control the operation of the terminal device regarding the system call, the hardware, and the middleware.

Furthermore, the terminal control apparatus 100 can decide the appropriate control contents and appropriately specify the terminal device to be affected by the fragility in response to the contents of the fragility, the situation where the fragility occurs, the operating system to be affected by the fragility, the hardware to be affected by the fragility, the middleware to be affected by the fragility, and the degree of severity of the fragility.

Furthermore, the terminal control apparatus 100 can appropriately specify the terminal device to be affected by the fragility in response to the operating system provided in the terminal device, the hardware provided in the terminal device, the middleware provided in the terminal device, the program owned by the terminal device, the update timing of the program in the terminal device, the notification timing of the control policy to the terminal device, and the like.

Various modifications will become possible for those skilled in the art after receiving the teachings of the present disclosure without departing from the scope thereof.

What is claimed is:

1. A terminal control apparatus, comprising:
   a fragility detection unit which detects fragility information including program identification information which identifies a program and including information concerning fragility of a program, from a terminal device or a server via a network;
   a control content decision unit which decides control contents which is information to be used to control operation of the terminal device which has the program having the fragility, based on the fragility information;
   a terminal information registration unit which acquires terminal information concerning the terminal device from the terminal device including the terminal identification information identifying the terminal device and program identification information identifying one or more programs included on the terminal device;
   a terminal specifying unit which specifies, based on the program identification information included in the fragility information and the program identification information included in the terminal information, a terminal device to be affected by the fragility of the program;
   a control content notification unit which notifies the control contents to the terminal device specified by the terminal specifying unit and does not notify the control contents to any terminal devices which are not specified the by the terminal specifying unit,
   wherein the control content decision unit decides the control contents based on policy decision information in which degrees of severity of the fragility are associated with control content, and
   the fragility information includes an entry which associates a contents of the fragility which indicates an unintended action that occurs, a situation where the fragility occurs, an operating system to be affected by the fragility, hardware to be affected by the fragility, middleware to be affected by the fragility, and a degree of severity of the fragility, the degree of severity being one of a plurality of predetermined degrees of severity which includes a highest degree of severity and a lowest degree of severity and the degree of severity being based on an effect the fragility has on security or continuation of an operation.

2. The terminal control apparatus according to claim 1, wherein the fragility detection unit verifies correctness of the detected fragility information, and
   the control content decision unit decides the control contents based on the fragility information determined to have the correctness by the verification.

3. The terminal control apparatus according to claim 1, wherein the terminal specifying unit specifies a terminal in which the program has been updated, and
   the control content decision unit decides the control contents in response to the update of the program.

4. The terminal control apparatus according to claim 1, wherein the control content decision unit decides at least one of the control contents regarding a system call, the control contents regarding hardware, and the control contents regarding middleware.

5. The terminal control apparatus according to claim 1, wherein the terminal information is at least one of an operating system provided in the terminal device, hardware provided in the terminal device, middleware provided in the terminal device, a program owned by the terminal device, update timing of the program in the terminal device, notification timing of the control contents to the terminal device, and the notified control contents.

6. A terminal control method, implemented on a terminal control apparatus, comprising:
   detecting fragility information including program identification information which identifies a program and including information concerning fragility of a program, from a terminal device or a server via a network;
   deciding control contents which is information to be used to control operation of the terminal device which has the program having the fragility, based on the fragility information;
   acquiring terminal information concerning the terminal device from the terminal device including the terminal identification information identifying the terminal device and program identification information identifying one or more programs included on the terminal device;
   specifying, based on the program identification information included in the fragility information and the program identification information included in the terminal information, a terminal device to be affected by the fragility of the program; and notifying the control contents to the specified terminal device, and not notifying the control contents to any terminal devices which are not specified in the specifying step, wherein the deciding the control contents includes deciding the control contents based on policy decision information in which degrees of severity of the fragility are associated with control content, and the fragility information includes an entry which associates a contents of the fragility which indicates an unintended action that occurs, a situation where the fragility occurs, an operating system to be affected by the fragility, hardware to be affected by the fragility, middleware to be affected by the fragility, and a degree of severity of the fragility, the degree of severity being one of a plurality of predetermined degrees of severity which includes a highest degree of severity and a lowest degree of severity and the degree of severity being based on an effect the fragility has on security or continuation of an operation.

7. The terminal control apparatus according to claim 1, wherein the fragility detection unit receives operation status information including the program identification information and information on an operation status of the program, from the terminal device in which the program is introduced, and detects the fragility information form the operation status information.

8. The terminal control apparatus according to claim 1, wherein the terminal information registration unit acquires the terminal information when the program is newly introduced to the terminal device, or when the program is updated to the terminal device, or periodically, from the terminal device in which the program is introduced.

9. The terminal control apparatus according to claim 1, wherein the fragility detection unit detects the degree of severity of the fragility, based on contents of the fragility and an occurrence possibility of an attack to the fragility.

10. The terminal control apparatus according to claim 1, wherein the policy decision information includes a control target which is associated with a fragility occurrence situation included in the fragility information, and the control content decision unit decides the control target to apply the control contents added, based on the policy decision information.

* * * * *